(12) United States Patent
Schuler

(10) Patent No.: US 6,494,114 B1
(45) Date of Patent: Dec. 17, 2002

(54) VEHICLE STEERING WHEEL

(75) Inventor: Patrik Schuler, Obernburg (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/598,627

(22) Filed: Jun. 21, 2000

(30) Foreign Application Priority Data

Jun. 23, 1999 (DE) .......................... 299 10 991

(51) Int. Cl.[7] .................................. B62D 1/11
(52) U.S. Cl. .......................... 74/558; 74/552
(58) Field of Search .................. 74/490, 473.29, 74/552, 558, 558.5; 29/894.1

(56) References Cited

U.S. PATENT DOCUMENTS

| | | | | |
|---|---|---|---|---|
| 1,847,758 A | * | 3/1932 | Geyer | 74/490 |
| 3,576,139 A | * | 4/1971 | Conterno | 29/894.1 |
| 4,633,734 A | * | 1/1987 | Yano et al. | 74/552 |
| 4,633,800 A | * | 1/1987 | Wolf, Jr. | 74/552 |
| 4,788,759 A | * | 12/1988 | Yano et al. | 74/558 |
| 4,892,006 A | * | 1/1990 | Endo et al. | 75/552 |
| 4,960,009 A | * | 10/1990 | Schultz et al. | 74/473.29 |
| 5,868,041 A | * | 2/1999 | Suzuki | 74/552 |

FOREIGN PATENT DOCUMENTS

| | | | |
|---|---|---|---|
| DE | 3927383 A1 | * | 2/1991 |
| JP | 60-151173 | * | 8/1985 |

* cited by examiner

*Primary Examiner*—Chong H. Kim
(74) *Attorney, Agent, or Firm*—Tarolli, Sundheim, Covell, Tummino & Szabo L.L.P.

(57) ABSTRACT

The invention relates to a vehicle steering wheel which comprises a steering wheel skeleton consisting of a steering wheel rim having an interior space, and of a hub and at least one spoke connecting the hub with the steering wheel rim. The vehicle steering wheel further comprises at least one additional mass fastened to the steering wheel skeleton and constructed as a separate part. The at least one additional mass is intended for reducing vibration and is provided in the interior space of the steering wheel rim. At least one flexible clip is provided which engages on the additional mass and holds the additional mass against the steering wheel skeleton.

13 Claims, 2 Drawing Sheets

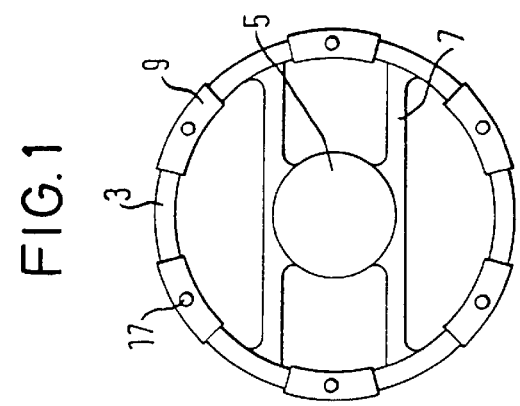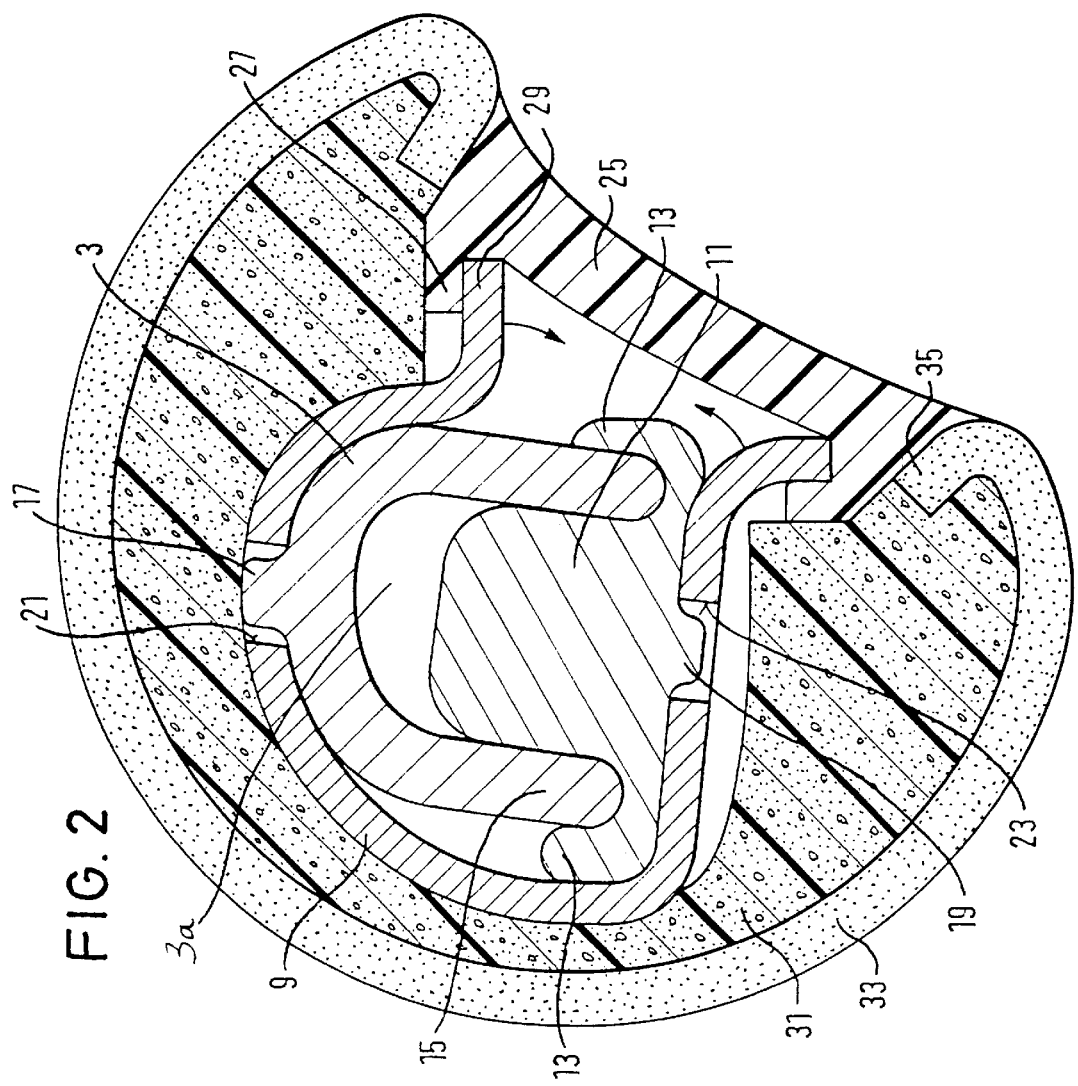

VEHICLE STEERING WHEEL

TECHNICAL FIELD

The invention relates to a vehicle steering wheel.

BACKGROUND OF THE INVENTION

Standard vehicle steering wheels may be provided with separate additional masses to be fastened at desired sites on the steering wheel skeleton. These additional masses are intended to increase the inert mass of the vehicle steering wheel as a whole and to largely prevent vibrations. Additional masses have generally hitherto been fastened to the hub.

As slight modifications to the steering wheel also lead to a different coordination of the steering wheel with respect to the inert masses of its individual parts, slightly lighter or heavier additional masses are to be able to be fastened to the steering wheel skeleton quickly and simply, without a reconstruction of the steering wheel being required. Such a fine coordination of the individual parts of a steering wheel is also appropriate if with the same steering wheel skeleton different embodiments are to be produced (e.g. with additional facings or function switches).

BRIEF SUMMARY OF THE INVENTION

The invention provides a vehicle steering wheel, in which the additional mass for reducing vibration can be arrested quickly and simply on the steering wheel skeleton. This is achieved in a vehicle steering wheel which comprises a steering wheel skeleton consisting of a steering wheel rim having an interior space, and of a hub and at least one spoke connecting the hub with the steering wheel rim. The vehicle steering wheel further comprises at least one additional mass for reducing vibration fastened to the steering wheel skeleton and constructed as a separate part. The at least one additional mass is provided in the interior space of the steering wheel rim. At least one flexible clip is provided which engages on the additional mass and holds the additional mass against the steering wheel skeleton. This clip makes possible a simple, rapid clipping of the additional mass on the steering wheel skeleton. As through the clip a separate part is available for fastening the additional mass to the steering wheel skeleton, the additional mass can also be constructed slightly differently and hence also with a slightly altered weight, without a different clip being required. By using such a clip, the additional mass is preferably also to be pressed in a prestressed manner against the steering wheel skeleton. The prestressing is to be selected such that no vibrations can occur between the additional mass and the steering wheel skeleton. For this purpose, it can be advantageous if in addition also a form-fitting connection is provided between the additional mass and the clip. This form-fitting connection prevents a faulty positioning of the additional mass and the clip with respect to each other on installation.

Preferably, a further form-fitting connection is present between the clip and the steering wheel skeleton. This also facilitates the exact positioning of the clip on the steering wheel skeleton on installation. Furthermore, such an additional form-fitting connection serves for the additional securing of the clip on the steering wheel skeleton.

The above-mentioned form-fitting connections can be formed for example by a recess and a corresponding projection, which projects into the recess.

According to the preferred embodiment, several additional masses are fastened to the steering wheel rim by means of clips. The accommodating of the additional mass takes place here advantageously in the steering wheel itself, if the latter has a hollow profile which is open in cross-section. The clip presses the additional mass into the interior of this hollow profile and closes it. Thereby, the additional mass does not project outwards with respect to the steering wheel rim, or only projects slightly, and also does not prevent the process of encasing with foam.

The clip which embraces the steering wheel rim can be secured in addition by a shell-shaped hard panel or cover visible from outside, which presses together the free ends or edges of the clip. In this connection, the clip has a dual function by not only fastening the additional mass but also the visible panel to the steering wheel rim. The visible panel is preferably a plastic panel or a panel of a different material such as aluminum, wood or composite material and is arranged on the inner face of the steering wheel rim in steering wheels having a particularly high-quality appearance. Its fastening can also be achieved according to one design by a clip connection, by the panel, the clip and the foam casing of the steering wheel being coordinated with each other such that with a steering wheel which is already encased in foam, possibly even already covered with leather, the panel is clipped onto the clip.

BRIEF DESCRIPTION OF THE DRAWINGS

FIG. 1 shows a top view onto a diagrammatically illustrated steering wheel skeleton according to the invention, with additional masses fastened thereon, FIG. 2 shows a cross-section through a steering wheel rim, encased in foam and covered with leather, of a steering wheel according to the invention in accordance with a first embodiment.

DETAILED DESCRIPTION OF THE PREFERRED EMBODIMENTS

Figure 4:
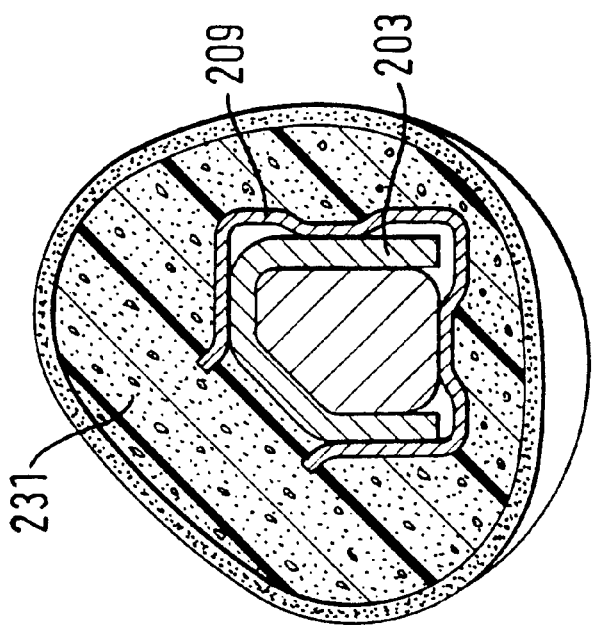
FIG. 4 shows a cross-section through a steering wheel rim, encased in foam and covered with leather, of a steering wheel according to the invention in accordance with a third embodiment.

In FIG. 1, a steering wheel skeleton is illustrated, consisting of a steering wheel rim 3, a steering wheel hub 5 and several spokes 7 connecting steering wheel rim 3 and steering wheel hub 5. Several additional masses are arranged, uniformly distributed across the periphery of the steering wheel rim 3, to increase the inertia of the steering wheel and hence to reduce the vibrations in driving operation. The additional masses can be seen in the following figures; in FIG. 1 only clips 9 can be seen, which each serve for arresting one additional mass on the steering wheel rim 3.

In FIG. 2, a greatly enlarged view through a steering wheel in the region of the steering wheel rim, the steering wheel rim 3 of the skeleton is illustrated as an open hollow section. The hollow section is open to the rear face of the steering wheel (at the bottom in the drawings). From this side, an additional mass 11 is inserted into the hollow section. The additional mass is adapted in its shape to the inner face of the hollow section, so that no transverse movements can occur between the steering wheel rim 3 and the additional mass 11. The additional mass of forged steel is accommodated almost completely in an interior space 3a (see FIG. 2) inside the steering wheel rim 3. Only two lateral extensions 13 surround the free edges 15 of the steering wheel rim 3 and serve for the additional fixing of the additional mass 11 on the steering wheel rim 3. The arresting of the additional mass 11 on the steering wheel rim 3 takes place by a clip 9 bent in a C-shape, which can be clipped from outside onto the steering wheel rim 3 which is not yet encased in foam and not yet covered with leather. The clip is formed from a wide band of spring steel and presses the additional mass 11 under prestressing into the interior of the steering wheel rim 3. So that the steering wheel rim 3 is positioned exactly to the clip 9 and the latter is positioned exactly to the additional mass 11, and so that the sites on the periphery of the steering wheel rim 3 on which the additional mass 11 is to be fastened are preset, form-fitting connections are provided between the steering wheel rim 3 and the clip 9 and also between the clip 9 and the additional mass 11. The form-fitting connections are formed by respectively at least one projection 17 on the front face of the steering wheel rim 3 and also one projection 19 on the additional mass 11 and also by recesses 21 and 23 in the clip 9, into which the projections 17 and 19, respectively, project. Also in FIG. 1 the projections 17 can be seen.

Steering wheels having a high-quality appearance can have panels 25, visible from outside, of plastic, aluminum, wood or composite material, which for example have an imitation of wood on the outside. A panel 25 of plastic, arranged on the inner face of the steering wheel rim, is shown in FIG. 2. A panel 25, which covers a segment of the steering wheel rim on the inner face, sits on the periphery of the steering wheel rim on the inner face in the region of each clip 9. The panel 25 has outer edges 27, which are directed towards each other. These edges 27 each grasp an associated, outwardly bent edge 29 of the clip 9. Thereby, a form-fitting connection results between the free edges of the clip 9 and the edges 27 of the panel 25. The panel 25 endeavors to press the edges 29 together and thus serves as an additional arresting of the clip 9. The clip 9 in turn serves to arrest the panel 25, because the panel 25 does not require an additional arrangement for its arresting on the steering wheel rim.

As can be additionally seen from FIG. 2, the shape of the clip 9 is largely adapted to the outer contour of the steering wheel rim 3 and also to the additional mass 11, so that there is effected an extensive abutment of the clip 9 against the steering wheel rim 3 on the front face and against the additional mass 11 on the rear face.

The steering wheel rim 3 together with the clips and additional masses 11 arranged thereon is surrounded by a foamed sheathing 31, adjoining which externally is a leather covering 33 in the embodiment which is shown. The leather covering 33 has ends 35 towards the panel 25, which are deflected into the interior of the foam casing of the steering wheel rim.

The production of the illustrated steering wheel is explained hereinbelow in detail. After the production of the steering wheel skeleton, the additional masses 11 are fastened by means of the clips 9 to the sites marked by the projections 17. In so doing, firstly each additional mass 11 is pressed into the hollow interior of the steering wheel rim 3. Then the clip 9 is put in place, the projections 17, 19 engaging into their recesses 21 and 23, respectively. Then the steering wheel is encased in foam and covered with leather. Finally, the panels 25 are inserted from the inner face of the steering wheel rim, with the edges 27, 29 forming a latching connection, for which reason the panels only have to be clipped onto the clips.

Figure 3:
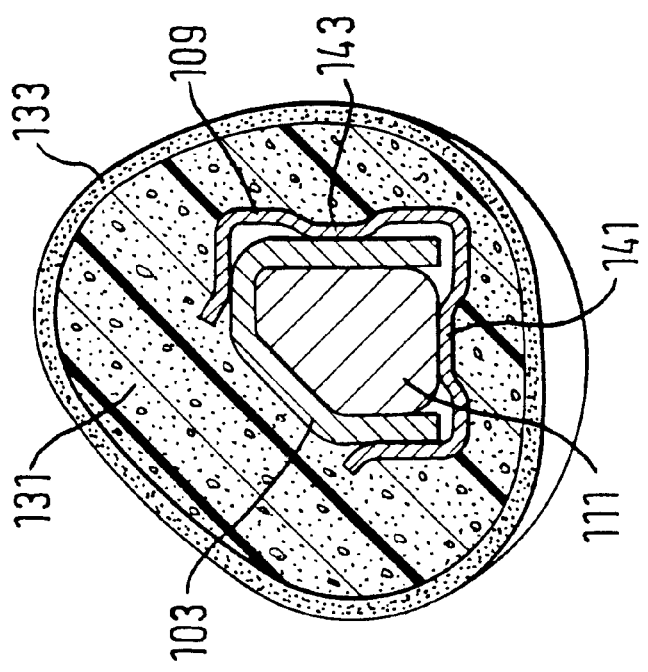
FIG. 3 shows a cross-section through a steering wheel rim, encased in foam and covered with leather, of a steering wheel according to the invention in accordance with a second embodiment.

The embodiment illustrated in FIG. 3 corresponds substantially to the one previously explained, the parts already explained having the reference numbers which have already been introduced, increased by the number 100. Other than with the embodiment shown in FIG. 2, the additional mass 111 is accommodated completely within the hollow interior of the steering wheel rim 103. It can also be pushed fully into this hollow interior. So that the elastic clip 109 lies with a prestressing against the additional mass 111, it has a projection 141 with which it contacts the additional mass 111. A further projection 143 serves to provide a prestressing in a transverse direction. As a further difference to the embodiment shown in FIG. 2, in this embodiment no panel is provided and hence also no additional securing for the clip 109.

The embodiment illustrated in FIG. 4 corresponds substantially to the one shown in FIG. 3 and already explained. Here, also, the reference numbers already used are used again, however again increased by the number 100. In contrast to the embodiment shown in FIG. 3, the clip 209 further embraces the steering wheel rim 203, so that it engages more securely on the steering wheel rim 203 of the skeleton.

For the fine adjustment of the steering wheel, additional masses of different weight can also be arranged on the steering wheel skeleton by the same clips. The additional masses are only constructed slightly longer or shorter, so that a type of modular system results, which by simple means permits an optimum coordination of the steering wheel with respect to its inert masses.

What is claimed is:

1. A vehicle steering wheel, comprising
   a steering wheel skeleton consisting of a steering wheel rim having an interior space, and of a hub and at least one spoke connecting said hub with said steering wheel rim,
   and comprising at least one additional mass intended for reducing vibration and fastened to said steering wheel skeleton and constructed as a separate part, said at least one additional mass being provided in said interior space of said steering wheel rim,
   at least one flexible clip being provided which engages on said additional mass and holds said additional mass against said steering wheel skeleton.

2. The vehicle steering wheel according to claim 1, wherein a form-fitting connection is provided between said additional mass and said clip.

3. The vehicle steering wheel according to claim 1, wherein a form-fitting connection is provided between said clip and said steering wheel skeleton.

4. The vehicle steering wheel according to claim 2, wherein said additional mass has a projection and said clip has a recess, said form-fitting connection being formed by means of said projection engaging said recess.

5. The vehicle steering wheel according to claim 3, wherein said steering wheel skeleton has a projection and said clip has a recess, said form-fitting connection being formed by means of said projection engaging said recess.

6. The vehicle steering wheel according to claim 1, wherein said additional mass is fastened to said steering wheel rim and said clip embraces said steering wheel rim.

7. The vehicle steering wheel according to claim 1, wherein said clip is constructed as a wide body covering a segment of said steering wheel rim and is adapted to an outer contour of said steering wheel rim in order to provide an extensive abutment at said outer contour of said steering wheel rim.

8. The vehicle steering wheel according to claim 1, wherein a plurality of clips are provided on a periphery of said steering wheel rim.

9. The vehicle steering wheel according to claim 6, wherein said steering wheel rim, as seen in cross-section, is an open hollow section, said additional mass projecting into said hollow section.

10. The vehicle steering wheel according to claim 9, wherein said clip presses said additional mass into said hollow section.

11. The vehicle steering wheel according to claim 1, wherein said steering wheel is provided with a foam casing which surrounds said clip.

12. The vehicle steering wheel according to claim 11, wherein said clip has free edges lying opposite each other and wherein a cover is provided which is visible from the outside and is fastened to said free edges of said clip so as to press said edges together.

13. The vehicle steering wheel according to claim 12, wherein said visible panel, said clip and said foam casing of said steering wheel are coordinated with each other such that with said steering wheel encased in foam, the panel can be clipped onto said clip.

* * * * *